(12) United States Patent
Koike

(10) Patent No.: US 9,096,192 B2
(45) Date of Patent: Aug. 4, 2015

(54) AIRBAG

(71) Applicant: NIHON PLAST CO., LTD., Shizuoka (JP)

(72) Inventor: Masahiro Koike, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/086,708

(22) Filed: Nov. 21, 2013

(65) Prior Publication Data

US 2014/0145422 A1    May 29, 2014

(30) Foreign Application Priority Data

Nov. 28, 2012   (JP) ................ 2012-259460

(51) Int. Cl.
| | |
|---|---|
| B60R 21/233 | (2006.01) |
| B60R 21/239 | (2006.01) |
| B60R 21/231 | (2011.01) |
| B60R 21/2346 | (2011.01) |

(52) U.S. Cl.
CPC ............ B60R 21/233 (2013.01); B60R 21/239 (2013.01); B60R 21/23138 (2013.01); B60R 21/2346 (2013.01); B60R 2021/23123 (2013.01); B60R 2021/23146 (2013.01); B60R 2021/23324 (2013.01)

(58) Field of Classification Search
CPC ............... B60R 21/231; B60R 21/233; B60R 21/23184; B60R 2021/23324; B60R 2021/23146; B60R 2021/23123
USPC .............................................. 280/730.2, 729
See application file for complete search history.

(56) References Cited

U.S. PATENT DOCUMENTS

| | | | | |
|---|---|---|---|---|
| 6,270,113 | B1 * | 8/2001 | Wipasuramonton et al. ............ | 280/730.2 |
| 6,364,348 | B1 * | 4/2002 | Jang et al. ............ | 280/730.2 |
| 6,478,329 | B1 * | 11/2002 | Yokoyama ............ | 280/729 |
| 7,073,818 | B2 * | 7/2006 | Hasebe ............ | 280/729 |
| 7,147,248 | B2 * | 12/2006 | Lee ............ | 280/740 |
| 7,226,077 | B2 * | 6/2007 | Abe ............ | 280/736 |
| 7,431,332 | B2 * | 10/2008 | Wipasuramonton et al. ............ | 280/730.2 |
| 7,658,400 | B2 * | 2/2010 | Wipasuramonton et al. ............ | 280/728.2 |
| 7,938,440 | B2 * | 5/2011 | Kataoka et al. ............ | 280/730.2 |
| 8,628,111 | B2 * | 1/2014 | Sugimoto et al. ............ | 280/729 |

(Continued)

FOREIGN PATENT DOCUMENTS

| | | |
|---|---|---|
| JP | 2000-177527 A | 6/2000 |
| JP | 2004-210047 A | 7/2004 |

(Continued)

*Primary Examiner* — Ruth Ilan
*Assistant Examiner* — Timothy Wilhelm
(74) *Attorney, Agent, or Firm* — Arent Fox LLP

(57) ABSTRACT

The present invention provides an airbag that is capable of stabilizing a flow of a gas introduced into a lower air chamber to thereby stabilize an expansion behavior, the air bag being capable of stably constraining an occupant. Along a bulkhead configured to partition an airbag main body portion into an upper air chamber and the lower air chamber, a patch is mounted into the lower air chamber so that a rear end part is opposed to a distributing portion. The patch is expanded by means of a gas introduced into the lower air chamber in an expanded state of an inflating portion of the airbag main body portion to thereby form a cover portion along an interior face of the lower air chamber and a redundant portion configured to slacken with respect to the interior face of the lower air chamber.

4 Claims, 3 Drawing Sheets

(56) References Cited

U.S. PATENT DOCUMENTS

| | | | |
|---|---|---|---|
| 8,696,021 B2 * | 4/2014 | Yamamoto | 280/730.2 |
| 2003/0201628 A1 * | 10/2003 | Roychoudhury et al. | 280/729 |
| 2007/0228701 A1 * | 10/2007 | Yamamura | 280/730.2 |
| 2010/0181749 A1 * | 7/2010 | Sugimoto | 280/743.2 |
| 2013/0328294 A1 * | 12/2013 | Fukawatase et al. | 280/730.2 |

FOREIGN PATENT DOCUMENTS

| | | |
|---|---|---|
| JP | 2006/049101 A1 | 5/2006 |
| JP | 2007-308122 A | 11/2007 |
| JP | 2011-126497 A | 6/2011 |

* cited by examiner (a)

(b)

(a)　　　　　　　　　　　(b)

AIRBAG

CROSS REFERENCE TO RELATED APPLICATIONS

This application claims priority of Japanese Patent Application No. 2012-259460 filed on Nov. 28, 2012. The contents of this application are incorporated herein by reference in their entirety.

BACKGROUND OF THE INVENTION

1. Field of the Invention

The present invention relates to an airbag that expands to a lateral side of a seated occupant by means of gas introduction.

2. Description of the Related Art

Conventionally, there has been known an airbag device for side impact, which expands an airbag to a lateral side of an occupant sitting in a vehicle's seat to thereby protect the occupant at the time of side face collision, for example.

In addition, as an airbag device of such type, there has been known an airbag device referred to as a side airbag device that is housed in a folded state in a side part of a seat, and that is configured to inflate and expand an airbag between an occupant and a door so as to thereby protect a chest part and a waist part of the occupant. This airbag device also includes: an airbag provided with a bag-shaped airbag main body portion; and an inflator that is housed in a rear side part of this airbag, the inflator being configured to supply a gas.

In addition, in such a side airbag device, there has been known a construction in which the airbag main body portion is partitioned by means of a bulkhead into an upper air chamber for chest part and a lower air chamber for waist part, and a tube passing through the bulkhead on the periphery of an inflator is provided along a vertical direction so as to distribute a gas from the elongated cylindrical inflator to the upper air chamber and the lower air chamber (refer to Japanese Unexamined Patent Application Publication No. 2011-126497, for example.).

However, in the airbag mentioned above, a gas jetted from a gas supply portion of a lower end part that is a tip end part of the inflator remains in the tube, the inflow to the lower air chamber is poor, and a gas configured to flow into the lower air chamber flows in one direction, that is, only toward a lower side, and therefore, there is a need for an additional member or the like for stabilizing an expansion behavior of the airbag.

In particular, in the airbag mentioned above, the gas jetted from the gas supply portion of the inflator directly hits a base cloth that constitutes the airbag main body portion, and thus, in order to disallow constraint of the occupant to become unstable due to such hitting of the gas, it is preferable to mount a patch that is a reinforce member, at the inside of the airbag main body portion, so as to be opposed to the gas supply portion, and however, it is also required that the flow of the gas is not restrained by such a patch.

The present invention has been made in view of such a circumstance, and it is an object of the present invention to provide an airbag that is capable of stabilizing the flow of the gas introduced into the lower air chamber to thereby stabilize an expansion behavior thereof, the air bag being capable of stably constraining an occupant.

SUMMARY OF THE INVENTION

An airbag according to a first aspect of the present invention is directed to an airbag that is housed in a folded state, the air bag being configured to expand to a lateral side of a seated occupant by means of gas introduction, the airbag comprising: a bag-shaped airbag main body portion including an inflating portion configured to inflate and expand when a gas is introduced, a bulkhead configured to vertically partition the inflating portion so as to partition and form an upper air chamber and a lower air chamber, and a distributing portion that is located at one end part of the bulkhead, and that is configured to distribute a gas to the upper air chamber and the lower air chamber; and a reinforce member, one end part of which is mounted in the lower air chamber so as to be opposed to the distributing portion along the bulkhead, the reinforce member being expanded by means of a gas introduced into a lower air chamber in an expanded state of an inflating portion of the airbag main body portion, in which a cover portion along an interior face of the lower air chamber and a redundant portion configured to slacken with respect to the interior face of the lower air chamber are formed.

An airbag according to a second aspect of the present invention is directed to the airbag according to the first aspect of the present invention, and is provided in such a manner that the reinforce member is mounted on the bulkhead at both side parts thereof, and is turned over upward at an intermediate part between both side parts in a state before expansion of the inflating portion of the airbag main body portion.

An airbag according to a third aspect of the present invention is directed to the airbag according to the first aspect of the present invention, and is provided in such a manner that the airbag main body portion includes a ventilation opening that is opened to the other end part of the bulkhead, the ventilation opening being configured to cause the upper air chamber and the lower air chamber to communicate with each other and then guide a part of the gas that is introduced into the lower air chamber, to the upper air chamber.

An airbag according to a second aspect of the present invention is directed to the airbag according to the fourth aspect of the present invention, and is provided in such a manner that in the expanded state of the inflating portion of the airbag main body portion, the upper air chamber is located on a lateral side of a chest part of the seated occupant, and the lower air chamber is located on a lateral side of a waist part of the seated occupant, and is set at a higher pressure than that in the upper air chamber.

With the airbag according to the first aspect of the present invention, the reinforce member is mounted in the lower air chamber in a state in which one end part thereof is opposed to the distributing portion along the bulkhead configured to partition the airbag main body portion into the upper air chamber and the lower air chamber, the reinforce member is expanded by means of the gas introduced into the lower air chamber in the expanded state of the inflating portion of the airbag main body to thereby form a cover portion along an interior face of the lower air chamber and a redundant portion configured to slacken with respect to the interior face of the lower air chamber, and therefore, this reinforce member does not restrain a direction of the gas introduced into the lower air chamber, the flow of the gas introduced into the lower air chamber can be stabilized, the expansion behavior of the inflating portion of the airbag main body portion can be stabilized, and the interior face of the lower air chamber is reliably reinforced by means of the reinforce member and then an occupant can be stably constrained.

With the airbag according to the second aspect of the present invention, in addition to the advantageous effect of the airbag according to the first aspect of the present invention, the reinforce member are a member in which both side parts are mounted on the bulkhead of the airbag main body portion, and the intermediate part between both side parts is turned over upward in the state before expansion of the inflating portion of the airbag main body portion, whereby the reinforce member can be compactly housed in the lower air chamber.

With the airbag according to the third aspect of the present invention, in addition to the advantageous effect of the airbag according to the first aspect of the present invention, a ventilation opening that causes the upper air chamber and the lower air chamber to communicate with each other and then guides a part of the gas introduced into the lower air chamber to the upper air chamber is opened at the other end part of the airbag main body portion, whereby the gas can be reliably guided through the ventilation opening to the other end part of the upper air chamber that is spaced from a gas supply location, and the expansion behavior of the inflating portion of the airbag main portion is stabilized more significantly.

With the airbag according to the fourth aspect of the present invention, in addition to the advantageous effect of the airbag according to any one of the first to third aspects of the present invention, in the expanded state of the inflating portion of the airbag main body portion, the lower air chamber that is located on the lateral side of the waist part of the occupant is set at a higher pressure than a pressure in the upper air chamber that is located on the lateral side of the chest part of the occupant, whereby the lower air chamber is expanded with a great resistance force, the waist part with a comparatively large mass is supported speedily and reliably, and an occupant can be stably protected.

DESCRIPTION OF THE PREFERRED EMBODIMENTS

Hereinafter, an embodiment of an airbag according to the present invention will be described with reference to the drawings.

Figure 1:
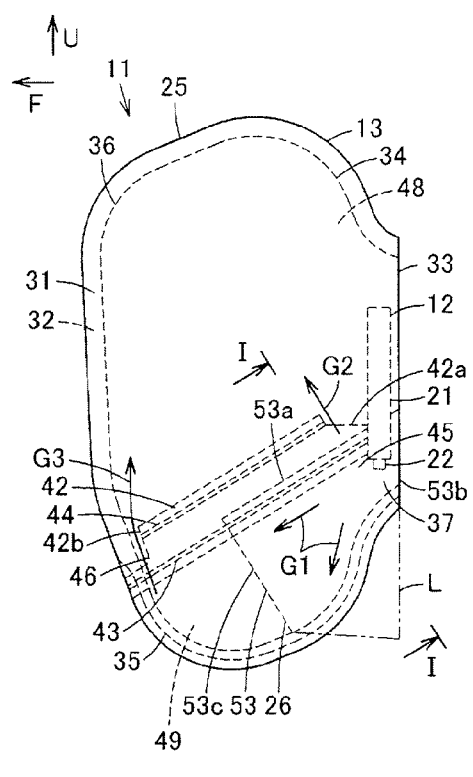
FIG. 1 shows an embodiment of an airbag according to the present invention, wherein FIG. 1 (*a*) is an illustrative view of a case in which an airbag in an expanded state is viewed from a lateral side, and FIG. 1 (*b*) is a sectional view taken along the line I-I of FIG. 1 (*a*)
Figure 1:
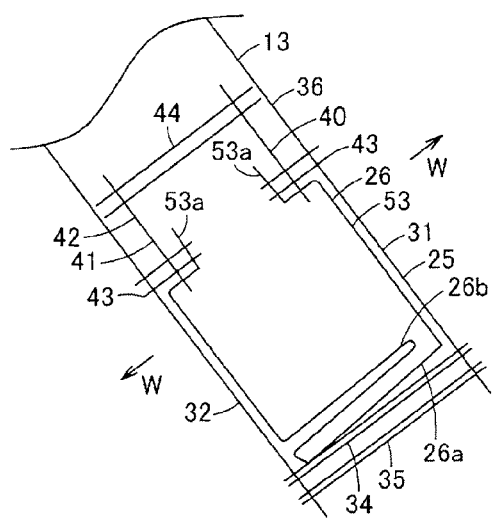
Figure 2:
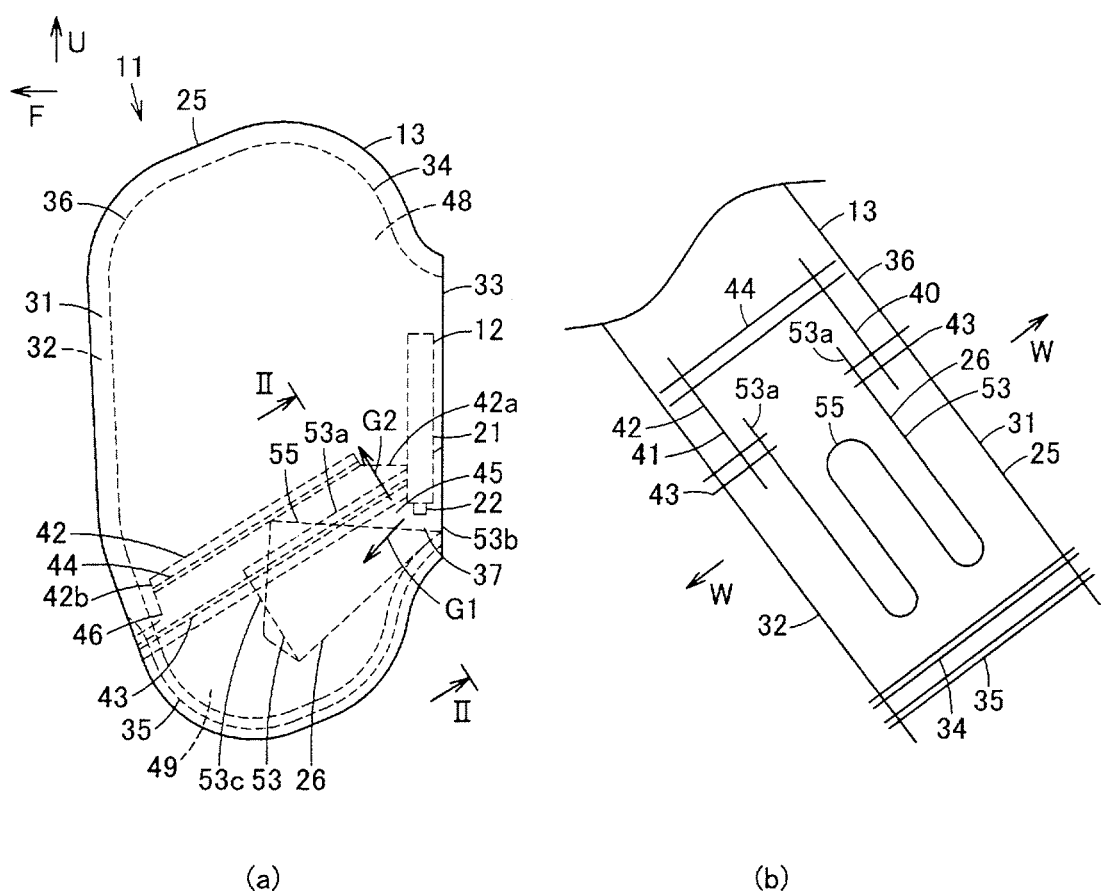
FIG. 2 (*a*) is an illustrative view of a case in which an airbag before expanded is viewed from a lateral side, and FIG. 2 (*b*) is a sectional view taken along the line II-II of FIG. 2 (*a*)
Figure 3:
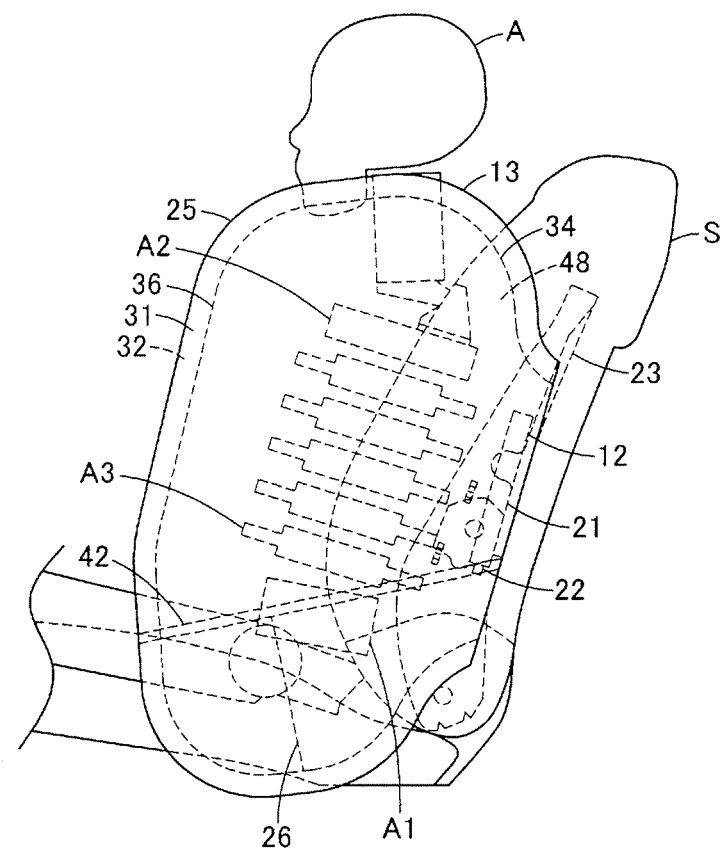
FIG. 3 is an illustrative view of a case in which an airbag device provided with the same airbag is viewed from a lateral side.

In FIG. 1 to FIG. 3, reference numeral 11 designates an airbag device, and this airbag device 11 constitutes a so called side airbag device mounted on a seat S of an interior room in a vehicle, the seat being a member targeted to be mounted, the side airbag device being configured to inflate and expand an airbag between a door (not shown) of a vehicle body, the door being opposed to an occupant A targeted to be protected, the occupant sitting in the seat S, to thereby protect the occupant A. It is to be noted that the occupant A is shown by means of a dummy object, and this occupant A constitutes a waist part A1, a chest part A2, and an abdominal part A3. In addition, as far as directions such as forward and backward, lateral, and longitudinal directions are concerned, with reference to a cruising direction of a vehicle, the arrow F of FIG. 1 indicates a forward direction, the arrow U of the figure indicates an upward direction, and the arrow W of FIG. 1 (*b*) and FIG. 2 (*b*) indicates a lateral direction.

In addition, this airbag device 11 is provided with: an inflator 12 configured to generate and jet a gas; an airbag 13 inflated and expanded by means of a gas supplied from this inflator 12; a fixture, although not shown, which is configured to connect these inflator 12 and airbag 13 to each other and then fix them to a seat; and a resin casing member, although not shown, which is a cover member to house these members.

The inflator 12 is provided with: a substantially cylindrical main body portion 21; and a gas supply portion 22 that is protruded from one end part of this main body portion 21. In addition, a terminal portion, although not shown, for operating this inflator 12, is provided at the other end part of the main body portion 21. Further, the gas supply portion 22 is also referred to as a diffuser or a nozzle, and is protruded from one end part of the main body portion 21 in a cylindrical shape of a diametrical dimension which is smaller than that of the main body portion 21 or which is substantially equal to that of the main body portion 21, and a plurality of circular holes that serve as gas discharge openings are formed on a circumferential face of the gas supply portion. That is, this gas supply portion 22 is provided at one end part of the inflator 12, having a slight lengthwise dimension. In addition, this inflator 12 is of a so called hybrid type, for example, such that an ignition signal is supplied to a terminal portion to thereby react a propellant charged into the main body portion 21, and release the gas reserved in a cylinder at the inside of the main body portion 21 so as to thereby jet a gas with a relatively low temperature from the gas supply portion 22.

Furthermore, the fixture is also referred to as a retainer, and is formed by folding a metal plate around an outer circumference of the inflator 12, for example, and in a state in which the inflator 12 is retained, a bolt that is a mounting means is caused to pass through the airbag 13; and further, the bolt is inserted into a member 23 such as a frame constituting the seat S and thereafter a nut is securely screwed and clamped so that the fixture, the inflator 12, and a rear end part of the airbag 13 are thereby fixed to the seat S.

Still furthermore, the airbag 13 is provided with: a bag-shaped airbag main body portion 25 that is constructed by sewing a base cloth referred to as one or more panels; and a patch 26 that is a reinforce member mounted at the inside of this airbag main body portion 25.

In the embodiment, the airbag main body portion 25 is constructed in a flat bag shape by overlapping two inside and outside base cloths 31 and 32 of a same type with each other and then sewing the proximity of an outer circumferential part with sewing portions 34 and 35 except a portion of an opening portion 33 at a rear end that serves as a component insert portion, the inside thereof serves as an inflating portion 36, and at a lower side part of a rear end part of this inflating portion 36, a gas introducing portion 37 is set. In addition, this gas introducing portion 37 at a rear side serves as a terminal portion at a rear side in an expanded direction of the airbag main body portion 25 (the airbag 13). Further, a bulkhead 42 formed of the two inside and outside base cloths 40 and 41 of a substantially same type is provided at the inside of the airbag main body portion 25. This bulkhead 42 is formed by sewing each one side part along a longitudinal direction of the rectangular base cloths 40 and 41 with the base cloths 31 and 32 that constitute the airbag main body portion 25 so as to be taken along a sewing portion 43, and sewing the other side parts of the base cloths 40 and 41 with each other by means of a sewing portion 44. In addition, this bulkhead 42 is caused to expose a base end part 42*a* that is one end part (a rear end part) to the gas introducing portion 37, is inclined so as to lower to a front end, and then, is sewn at the sewing portion 43 with a tip end part 42*b* that is the other end part (a front end part).

This sewing portion 43 is continuous to the sewing portion 34 at a position of a tip end part 42b of the bulkhead 42. Further, at the base end part 42a of this bulkhead 42, a distributing portion 45 configured to distribute a gas from the inflator 12 is formed at the gas introducing portion 37 so as to be opposed to the gas supply portion 22 of inflator 12, and an upward portion of the tip end part 42b is spaced rearward from the sewing portion 34, and further, a ventilation opening 46 through which a gas can pass is formed.

In addition, by means of this bulkhead 42, the airbag main body portion 25 is expanded so as to be flat at a predetermined widthwise dimension thereof, and an inflating portion 36 of the airbag main body portion 25 is partitioned into an upper air chamber 48 that is a first air chamber located at an upper side and a lower air chamber 49 that is a second air chamber located at a lower side. In addition, the upper air chamber 48 is a chamber chest and abdomen, and is configured to expand so as to be opposed to a chest part A2 and an abdominal part A3 of an occupant A at the time of expansion of the airbag 13. In addition, the lower air chamber 49 is a chamber for waist, and is configured to expand so as to be opposed to a waist part A1 of the occupant A at the time of expansion of the airbag main body portion 25 (the inflating portion 36). In addition, a capacity of the lower air chamber 49 is formed so as to be smaller than a capacity of the upper air chamber 48. Further, the upper air chamber 48 and the lower air chamber 49 are caused to communicate with each other by means of a ventilation opening 46. Furthermore, the lower air chamber 49 is set at a higher pressure than a pressure in the upper air chamber 48 in the expanded state of the inflating portion 36 of the airbag main body portion 25. Still furthermore, at a lower position of the lower air chamber 49, the base cloths 31 and 32 are sewn in double by means of the sewing portions 34 and 35, respectively.

In addition, in proximity to a rear end part of the airbag main body portion 25, two pairs of top and bottom mounting holes, although not shown, are formed so as to communicate with each other in a folded state. Further, at the inflating portion 36, a restraining portion configured to restrain a widthwise dimension thereof at the time of expansion is formed as required while the base cloths 31 and 32 are sewn with each other, for example.

In addition, the patch 26 is formed by one rectangular base cloth 53 with an appropriate flame resistivity thereof which is stronger than that of the base cloths 31 and 32 that constitute the airbag main body portion 25, and with one side part of each of the base cloths 40 and 41 that constitute the bulkhead 42, each side part is sewn along the sewing portion 43 with respect to the base cloths 31 and 32 that constitute the airbag main body portion 25, such each side part is integrally mounted on the airbag main body portion 25, and the mounted portion is located in the lower air chamber 49. With respect to this base cloth 53, each side edges 53a is formed in a linear shape, and a rear end edge 53b that is one end edge is formed in a linear shape so as to be inclined in an acute angle shape with respect to such each side edge 53a, and a front end edge 53c that is the other end edge is formed in a linear shape so as to cross in an orthogonal manner with respect to such each side edges 53a. In addition, with respect to this base cloth 53, such each side edge 53a is substantially parallel to the sewing portion 43, the rear end edge 53b extends downward along a vertical direction, and is positioned at a rear end part of the airbag main body portion 25, and the front end edge 53c extends downward along a substantially orthogonal direction with respect to the sewing portion 43 at a position that is more proximal to a front side than a central position in a forward and backward direction of the bulkhead 42. Further, this patch 26 (the base cloth 53) has a longer circumferential length with respect to a circumferential length of an interior face that corresponds to the lower air chamber 49 of the base cloths 31 and 32 that constitute the airbag main body portion 25. In other words, this patch 26 (the base cloth 53) is formed at a length that overflows downward of this airbag main body portion 25 before sewing the base cloths 40 and 41 of the airbag main body portion 25 with each other (an imaginary line L). Furthermore, with respect to this patch 26 (the base cloth 53), the intermediate part between both side parts, each of which is mounted on the airbag main body portion 25, is employed as a fold portion 55 that is turned over upward in a state before expansion of the inflating portion 36 of the main body portion 25, in other words, in a state in which the base cloths 31 and 32 are overlapped with each other. That is, this fold portion 55 is formed by turning over upward the intermediate part between both side parts of the patch 26 (the base cloth 53), at a position taken along the sewing portion 34 at a rear part of the lower air chamber 49 of the airbag main body portion 25, and the above fold portion is formed in a W shape when the fold portion is viewed from a front side. In this state, with respect to the patch 26, a rear end part of the fold portion 55 (a lower portion of the rear end edge 53b of the base cloth 53) is disposed so as to be opposed to the distributing portion 45, and is formed in a horizontal shape that is substantially perpendicular to a vertical direction that corresponds to a longitudinal direction of the inflator 12.

In addition, this airbag device 11 constitutes an assembly formed by assembling the inflator 12 and the fixture with each other, and this assembly is inserted into the airbag main body portion 25 that is folded at the fold portion 55, by mounting the patch 26, and a bolt that serves as the fixture is drawn to the outside through a mount hole of the folded airbag main body portion 25 and then the airbag 13 is folded in an appropriate state to be thereby able to assemble the device. In this state, as described above, the gas supply portion 22 of the inflator 12 is disposed at the gas introducing portion 37 of the airbag 13 so as to be opposed to the opening portion 33. Further, this airbag device 11 is housed in a casing, although not shown, as required, and is further housed in a side part of a seat S, and with the use of a nut or the like, a bolt that serves as a fixture is fixed to the member 23 such as the frame of the seat S, whereby the airbag device 11 is mounted on the seat S of a vehicle. Further, a terminal portion of the inflator 12 of this airbag device 11 is connected to a control device as a control means that is provided on a vehicle side via a harness, for example. This control device is provided with a CPU, is connected one or a plurality of sensors, and transmits an ignition signal configured to start up the inflator 12 in accordance with a posture of the occupant A or a state of collision. Furthermore, as the sensors, there may be employed as sensor detects a body shape or a posture of the occupant A: a CCD camera configured to; a weight sensor that is incorporated in the seat S; and a seat reclining sensor or the like configured to detect a forward and backward position or a reclining state of the seat S, as required. Still furthermore, as the sensors, there may be employed a collision detecting sensor on a surface of a vehicle body side, as sensor detects a state of collision.

If a vehicle is subjected to an impact such as a side face collision, based on a sensing signal from each sensor, the control means starts up the inflator 12 in an appropriate state to protect the occupant A, and jets a gas from the gas supply portion 22. Afterwards, due to a pressure of this gas, the airbag 13 opens a cover, protrudes from the seat and then inflates and expands between the occupant A and a door panel.

The gas jetted from the gas supply portion 22 of the inflator 12 to the outer circumferential side is then vertically distributed and guided by means of the distributing portion 45, and there occur: a lower gas flow G1 going to a lower end part that is a tip end part in a vertical direction of the lower air chamber 49; and an upper gas flow G2 going to an upper end part that is a tip end part in a vertical direction of the upper air chamber 48 (FIG. 2 (a)). Further, the lower gas flow G1 is directly blown to the fold portion 55 of the patch 26 (FIG. 2 (b)) that is folded in the W shape when the fold portion is viewed from a front side, this fold portion 55 is pushed downward, and this patch 26 is overlapped along both side parts of the lower air chamber 49 and along a lower interior face (FIG. 1 (a)). That is, the gas jetted from the gas supply portion 22 of the inflator 12 is not directly blown by means of the patch 26 to the base cloths 31 and 32 that constitute the airbag main body portion 25. Furthermore, in this state, with respect to the patch 26, there are formed: a cover portion 26a configured to cover a part of this interior face all over a side of an occupant A and an opposite side to the occupant A along the interior face of the lower air chamber 49; and a redundant portion 26b that is spaced from the interior face of the lower air chamber 49 and that is configured to slacken (become redundant), the redundant portion being overlapped on the cover portion 26a at a lower position of the lower air chamber 49, in particular (FIG. 1 (b)). Therefore, the lower gas flow G1 going into the lower air chamber 49 spreads all over the lower air chamber 49 without being restrained by the bulkhead 42, and also inflows as an auxiliary gas flow G3 that is a subsidiary flow from the ventilation opening 46 to the upper air chamber 48. In this manner, by means of the lower gas flow G1, the lower air chamber 49 is inflated and expanded and then the patch 26 is expanded, and by means of the upper gas flow G2 and the auxiliary gas flow G3, the upper air chamber 48 is inflated and expanded and then an entire region of the airbag main body portion 25 is expanded so as to be flat to thereby protect the occupant A.

Thus, according to the embodiment, along the bulkhead 42 configured to partition the airbag main body portion 25 into the upper air chamber 48 and the lower air chamber 49, the patch 26 is mounted into the lower air chamber 49 in a state in which a rear end part thereof is opposed to the distributing portion 45, and this patch 26 is expanded by means of the gas introduced into the lower air chamber 49 in the expanded state of the inflating portion 36 of the air bag main body portion 25 to thereby form the cover portion 26a along the interior face of this lower air chamber 49 and the redundant portion 26b that is configured to slacken with respect to the interior face of the lower air chamber 49, that is, a circumferential length of the patch 26 is increased so as to form the redundant portion 26b that becomes redundant with respect to the lower air chamber 49 at the time of expansion, whereby this patch 26 does not restrain the direction of the gas introduced into the lower air chamber 49, and the flow of the gas introduced into the lower air chamber 49 can be stabilized. Therefore, the expansion behavior of the inflating portion 36 of the airbag main body portion 25 can be stabilized, and the interior face of the lower air chamber 49 is reliably reinforced by means of the patch 26 and then the occupant A can be stably constrained.

In addition, the patch 26 is formed by the base cloth 53 with an appropriate flame resistivity thereof, whereby the periphery of the distributing portion 45 that is subjected to an environment of a high temperature and a high pressure by means of the gas jetted from the gas supply portion 22 of the inflator 12 can be protected more reliably by means of the patch 26, and the airbag main body portion 25 can be protected more reliably from a heat and a pressure (a heat damage) exerted by the gas.

In addition, with respect to the patch 26, both side parts are mounted on the bulkhead 42 of the airbag main body portion 25, and the intermediate part between both side parts is employed as the fold portion 55 that is turned over upward in the state before expansion of the inflating portion 36 of the airbag main body portion 25, whereby the patch 26 (the base cloth 53) can be compactly housed in the lower air chamber 49 of the airbag main body portion 25, and the gas supplied from the inflator 12 directly hits the fold portion 55, and further, this fold portion 55 is pushed downward and expanded, so that the patch 26 can be expanded more reliably.

Further, the ventilation opening 46 configured to cause the upper air chamber 48 and the lower air chamber 49 to communicate with each other and then guide a part of the gas introduced into this lower air chamber 49 to the upper air chamber 48 is opened at the tip end part 42b of the bulkhead 42 of the airbag main body portion 25, whereby the gas can be reliably guided from the ventilation opening 46 to a tip end part of the upper air chamber 48 that is spaced from the inflator 12 that is a gas supply location, and the expansion behavior of the inflating portion 36 of the airbag main body portion 25 can be stabilized more significantly.

Furthermore, in the expanded state of the inflating portion 36 of the airbag main body portion 25, the lower air chamber 49 that is located on the lateral side of the waist part A1 of the occupant A sitting in the seat of a vehicle is set at a higher pressure than a pressure in the upper air chamber 48 that is located on the lateral side of the chest part A2 of the occupant A sitting in the vehicle's seat, whereby the lower air chamber 49 is expanded with a great resistance force, the waist part A1 with a comparatively large mass thereof is supported speedily and reliably, and the occupant A can be stably protected.

It is to be noted that in the embodiment, the bulkhead 42 can be formed by employing the base cloths 40 and 41 as independent members, or alternatively, by sewing the base cloths 31 and 32 that constitute the airbag main body portion 25 with each other.

Still furthermore, the shapes or constructions of the inflator 12 and the airbag 13 are not limited to those mentioned above, and a variety of constructions can be employed. The inflator 12 can employ a so called pyro-type construction to supply a gas by means of combustion, for example. Yet furthermore, an exhaust opening (a vent hole) that is capable of discharging a gas supplied can be provided in the air bag 13.

[Industrial Applicability]

The airbag according to the present invention is employed as a so called side air bag that is housed in a side part of a seat of a vehicle, the side air bag being configured to expand between an occupant and a door to thereby protect the occupant.

What is claimed is:

1. An airbag that is housed in a folded state, and is configured to expand to a lateral side of a seated occupant by means of gas introduction, the airbag comprising:
    a bag-shaped airbag main body portion including an inflating portion configured to inflate and expand when a gas is introduced, a bulkhead configured to vertically partition the inflating portion so as to partition and form an upper air chamber and a lower air chamber, and a distributing portion that is located at one end part of the bulkhead, and that is configured to distribute a gas to the upper air chamber and the lower air chamber; and
    a reinforce member, one end part of which is mounted in the lower air chamber so as to be opposed to the distributing portion along the bulkhead, the reinforce member being expanded by means of a gas introduced into a lower air chamber in an expanded state of the inflating portion of the airbag main body portion, in which a cover portion along an interior face of the lower air chamber and a redundant portion configured to slacken with respect to the interior face of the lower air chamber are formed;

wherein the reinforce member is configured to inhibit gas from blowing directly on the main body portion without restraining a direction of the gas introduced into the lower air chamber.

2. The airbag according to claim 1, wherein the reinforce member is mounted on the bulkhead at both side parts of the reinforce member, and is turned over upward at an intermediate part between both side parts in a state before expansion of the inflating portion of the airbag main body portion.

3. The airbag according to claim 1, wherein the airbag main body portion comprises a ventilation opening that is opened to the other end part of the bulkhead, the ventilation opening being configured to cause the upper air chamber and the lower air chamber to communicate with each other and then guide a part of the gas that is introduced into the lower air chamber, to the upper air chamber.

4. The airbag according to claim 1, wherein in the expanded state of the inflating portion of the airbag main body portion, the upper air chamber is located on a lateral side of a chest part of a seated occupant, and the lower air chamber is located on a lateral side of a waist part of the seated occupant, and is set at a higher pressure than an pressure in the upper air chamber.

* * * * *